United States Patent
Rosenfeld et al.

(10) Patent No.: US 11,451,849 B2
(45) Date of Patent: *Sep. 20, 2022

(54) METHODS AND SYSTEMS FOR CONTENT CONTROL

(71) Applicant: Comcast Cable Communications, LLC, Philadelphia, PA (US)

(72) Inventors: Eric Scott Rosenfeld, Denver, CO (US); Gregory Allen Broome, Broomfield, CO (US)

(73) Assignee: COMCAST CABLE COMMUNICATIONS, LLC, Philadelphia, PA (US)

(*) Notice: Subject to any disclaimer, the term of this patent is extended or adjusted under 35 U.S.C. 154(b) by 129 days.

This patent is subject to a terminal disclaimer.

(21) Appl. No.: 16/913,912

(22) Filed: Jun. 26, 2020

(65) Prior Publication Data

US 2021/0058660 A1    Feb. 25, 2021

Related U.S. Application Data

(63) Continuation of application No. 15/080,032, filed on Mar. 24, 2016, now Pat. No. 10,743,052, which is a continuation of application No. 13/349,318, filed on Jan. 12, 2012, now Pat. No. 9,363,540.

(51) Int. Cl.
| | |
|---|---|
| H04N 21/2668 | (2011.01) |
| H04N 21/434 | (2011.01) |
| H04N 21/81 | (2011.01) |
| H04N 21/222 | (2011.01) |
| H04N 21/2389 | (2011.01) |
| H04L 67/1097 | (2022.01) |

(52) U.S. Cl.
CPC ....... *H04N 21/2668* (2013.01); *H04N 21/222* (2013.01); *H04N 21/23892* (2013.01); *H04N 21/4345* (2013.01); *H04N 21/812* (2013.01); *H04L 67/1097* (2013.01)

(58) Field of Classification Search
CPC ............. H04N 21/2668; H04N 21/222; H04N 21/23892; H04N 21/4345; H04N 21/812
See application file for complete search history.

(56) References Cited

U.S. PATENT DOCUMENTS

| | | |
|---|---|---|
| 6,020,931 A | 2/2000 | Bilbrey et al. |
| 6,895,166 B1 | 5/2005 | Schriebman |
| 7,031,348 B1 | 4/2006 | Gazit |
| 7,058,721 B1 | 6/2006 | Ellison et al. |
| 7,068,724 B1 | 6/2006 | Hamilton |
| 7,113,998 B1 | 9/2006 | Stern et al. |
| 7,584,491 B2 | 9/2009 | Bruckner et al. |
| 8,112,777 B2 | 2/2012 | Kim et al. |
| 8,924,995 B2 | 12/2014 | Ramaswamy et al. |
| 9,363,540 B2 | 6/2016 | Rosenfeld et al. |

(Continued)

OTHER PUBLICATIONS

ISO/IEC, "Generic Coding of Moving Pictures and Associated Audio", ISO/IEC 13818-2, (1994) (212 pages).

(Continued)

*Primary Examiner* — Joshua D Taylor
(74) *Attorney, Agent, or Firm* — Ballard Spahr LLP

(57) ABSTRACT

Methods and system for providing content based on an embedded signal are disclosed. A method can comprise generating a placement signal based on an event, repeatedly embedding the placement signal into a data stream, and transmitting the data stream comprising the repeatedly embedded placement signal.

26 Claims, 5 Drawing Sheets

(56) References Cited

U.S. PATENT DOCUMENTS

| | | |
|---|---|---|
| 2001/0043285 A1 | 11/2001 | Hicks et al. |
| 2002/0129151 A1 | 9/2002 | Yuen et al. |
| 2003/0053540 A1 | 3/2003 | Wang et al. |
| 2003/0194199 A1 | 10/2003 | Roth |
| 2004/0261128 A1 | 12/2004 | Fahy et al. |
| 2005/0039020 A1 | 2/2005 | Levy |
| 2006/0056809 A1 | 3/2006 | Quan |
| 2007/0022032 A1 | 1/2007 | Anderson et al. |
| 2007/0040934 A1 | 2/2007 | Ramaswamy et al. |
| 2007/0174774 A1 | 7/2007 | Lerman et al. |
| 2007/0250901 A1 | 10/2007 | McIntire et al. |
| 2007/0300273 A1 | 12/2007 | Turner |
| 2008/0104634 A1 | 5/2008 | Gajdos et al. |
| 2008/0126226 A1 | 5/2008 | Popkiewicz et al. |
| 2008/0155585 A1 | 6/2008 | Craner et al. |
| 2008/0243603 A1 | 10/2008 | Chu et al. |
| 2008/0304810 A1 | 12/2008 | Rijckaert et al. |
| 2009/0013347 A1 | 1/2009 | Ahanger et al. |
| 2009/0031339 A1 | 1/2009 | Pickens et al. |
| 2009/0074242 A1 | 3/2009 | Yamamoto et al. |
| 2009/0157450 A1 | 6/2009 | Athsani et al. |
| 2009/0165067 A1 | 6/2009 | Bruckman et al. |
| 2010/0027961 A1 | 2/2010 | Gentile et al. |
| 2010/0036930 A1 | 2/2010 | Pong |
| 2010/0046554 A1 | 2/2010 | Wilkinson |
| 2010/0100449 A1 | 4/2010 | Broberg et al. |
| 2010/0158099 A1 | 6/2010 | Kalva et al. |
| 2010/0161825 A1 | 6/2010 | Ronca et al. |
| 2011/0083144 A1 | 4/2011 | Bocharov et al. |
| 2011/0213654 A1 | 9/2011 | Yang |
| 2011/0264530 A1 | 10/2011 | Santangelo et al. |
| 2012/0060184 A1 | 3/2012 | Nguyen et al. |
| 2012/0109755 A1 | 5/2012 | Birch et al. |
| 2013/0151340 A1 | 6/2013 | Barbieri et al. |
| 2013/0185450 A1 | 7/2013 | Rosenfeld et al. |

OTHER PUBLICATIONS

Merriam-Webster, "fragment", (2014) (1 page).
Merriam-Webster, "interval", (2015) (1 page).
Merriam-Webster, "rate", (2015) (1 page).
Savvius formerly WildPackets, "IP Fragmentation", 2014 [last retrieved on Aug. 30, 2017 at https://www.savvius.com/networking-glossary/tcp_ip_overview/ip/ip_ fragmentation/] (12 pages).
Wikipedia, "Data fragmentation", (2014) (1 page).
Wikipedia, "IP fragmentation", (2014) (1 page).
Yoon et al., "Data Fragmentation Scheme in IEEE 802.15.4 Wireless Sensor Networks", (2007) (5 pages).

METHODS AND SYSTEMS FOR CONTENT CONTROL

CROSS REFERENCE TO RELATED PATENT APPLICATIONS

This application is a continuation of U.S. patent application Ser. No. 15/080,032 filed Mar. 24, 2016, which is a continuation of U.S. patent application Ser. No. 13/349,318, filed Jan. 12, 2012 and issued as U.S. Pat. No. 9,363,540, all of which are herein incorporated by reference in their entireties.

BACKGROUND

Currently, when a user device tunes to a source of content, there is no efficient, reliable, and timely manner by which the user device can be made aware of an alternative content that is intended to be presented to a user.

SUMMARY

It is to be understood that both the following summary and the following detailed description are exemplary and explanatory only and are not restrictive, as claimed. Provided are methods and systems for, in one aspect, controlling content in response to an embedded signal.

In an aspect, a method for content control can comprise generating a placement signal based on an event, repeatedly embedding the placement signal into a data stream, and transmitting the data stream comprising the repeatedly embedded placement signal.

In an aspect, a method for content control can comprise receiving a data stream, wherein a placement signal has been repeatedly embedded into the data stream, and wherein the placement signal is associated with an event, processing the placement signal to select a source of content data, and receiving the content data from the selected source.

In an aspect, a system can comprise a memory for storing at least a portion of a fragmented data stream, and a processor in communication with the memory, the processor configured to receive the fragmented data stream from the memory, wherein a placement signal has been repeatedly embedded into the fragmented data stream. The placement signal may be associated with an event and may be processed to select a source of content data, and receive the content data from the selected source.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
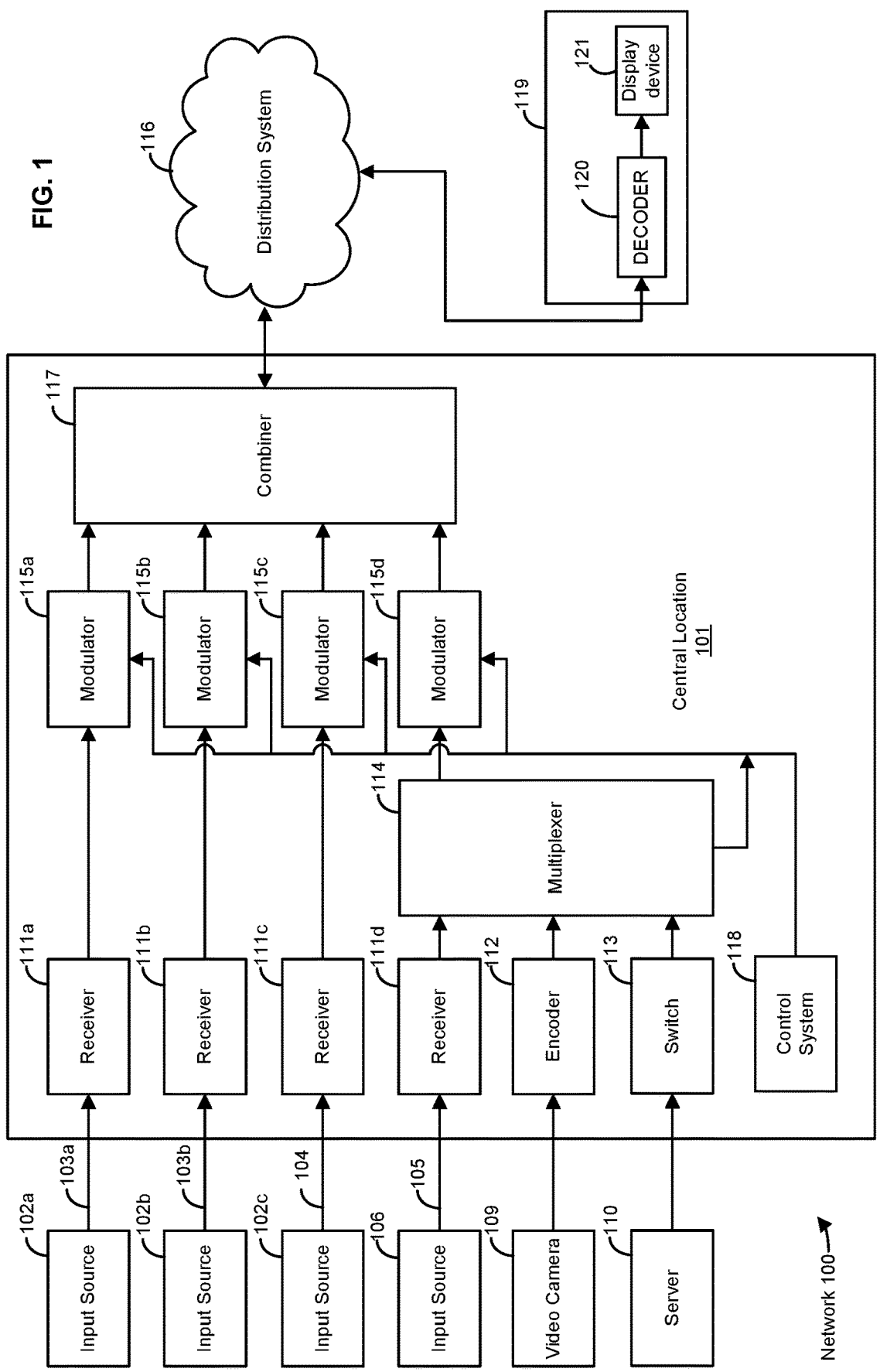
FIG. 1 is a block diagram of an exemplary network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and comprise the disclosed systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software.

Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

As described in greater detail below, provided are methods and systems for controlling content transmitted to a user location. In an aspect, a data stream transmitted to the user location can comprise a repeatedly embedded placement signal to indicate that a particular content should be transmitted to the user location.

FIG. 1 illustrates various aspects of an exemplary network environment in which the present methods and systems can operate. Some aspects of the present disclosure relate to methods and systems for content control. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The network 100 can comprise a central location 101 (e.g., a headend, or processing facility), which can receive content (e.g., data, input programming) from multiple sources. The central location 101 can combine the content from the various sources and can distribute the content to user (e.g., subscriber) locations (e.g., location 119) via distribution system 116.

In an aspect, the central location 101 can receive content from a variety of sources 102a, 102b, 102c. The content can be transmitted from the source to the central location 101 via a variety of transmission paths, including wireless (e.g. satellite paths 103a, 103b) and terrestrial path 104. The central location 101 can also receive content from a direct feed source 106 via a direct line 105. Content may also be created at the central location 101. Other input sources can comprise capture devices such as a video camera 109 or a server 110. The signals provided by the content sources can comprise a single content item or a multiplex that comprises several content items.

The central location 101 can comprise one or a plurality of receivers 111a, 111b, 111c, 111d that are each associated with an input source. For example, MPEG encoders such as encoder 112, are included for encoding/transcoding local content or a video camera 109 feed. As a further example, a data packaging device, such as a fragmentor, can be integrated with the encoder 112 (or separate and in communication with the encoder 112) to package the encoded/transcoded content. In an aspect, the encoder 112 and/or fragmentor can repeatedly embed markers, flags, and signals into the content data stream for processing by downstream devices. A switch 113 can provide access to server 110, which can be, for example, a pay-per-view server, a data server, an internet router, a network system, and/or a phone system. Some signals may require additional processing, such as signal multiplexing, prior to being modulated. Such multiplexing can be performed by multiplexer (mux) 114.

The central location 101 can comprise one or a plurality of modulators, 115a, 115b, 115c, and 115d, for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of network 100. The control system 118 can interface, monitor, and/or control a variety of functions, including, but not limited to, the channel lineup for the television system, billing for each user, and/or conditional access for content distributed to users. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, a decoder 120, such as a gateway or home communications terminal (HCT) can decode, if needed, the signals for display on a display device, such as on a display device 121 such as a television set (TV), a mobile device, or a computer monitor. Those skilled in the art will appreciate that the signal can be decoded in a variety of equipment, including an HCT, a computer, a TV, a monitor, or satellite dish. In an exemplary aspect, the methods and systems disclosed can be located within, or performed on, one or more HCT's, display devices 121, central locations 101, DVR's, home theater PC's, and the like. As an example, the decoder 120 can receive and process the embedded markers, flags, and signals in the content data stream for controlling a content received by the decoder 120.

In an aspect, user location 119 is not fixed. By way of example, a user can receive content from the distribution system 116 on a mobile device such as a laptop computer, PDA, smartphone, GPS, vehicle entertainment system, and/or portable media player. The network of FIG. 1 is illustrative only and other types of networks and configurations may be used to implement the disclosure.

In an aspect, the methods and systems can utilize digital audio/video compression such as MPEG, or any other type of compression. The Moving Pictures Experts Group (MPEG) was established by the International Standards Organization (ISO) for the purpose of creating standards for digital audio/video compression. The MPEG experts created the MPEG-1 and MPEG-2 standards, with the MPEG-1 standard being a subset of the MPEG-2 standard. The combined MPEG-1, MPEG-2, MPEG-4, and subsequent MPEG standards are hereinafter referred to as MPEG. In an MPEG encoded transmission, content and other data are transmitted in packets, which collectively make up a transport stream. In an exemplary aspect, the present methods and systems can employ transmission of MPEG packets. However, the present methods and systems are not so limited, and can be implemented using other types of transmission and data.

The output of a single MPEG audio and/or video coder may be a transport stream, comprised of one or more elementary streams. An elementary stream is an endless near real-time signal. For convenience, the elementary stream may be broken into data blocks of manageable size, forming a packetized elementary stream (PES). These data blocks need header information to identify the start of the packets and must include time stamps because packetizing disrupts the time axis. For transmission and digital broadcasting, for example, several programs and their associated PESs can be multiplexed into a multi-program transport stream. A multi-program transport stream has a program clock reference (PCR) mechanism that allows transmission of multiple clocks, one of which is selected and regenerated at the decoder.

A multi-program transport stream is more than just a multiplex of data, audio and/or video PESs. In addition to the compressed audio, video and data, a transport stream may include metadata describing the bit stream. This includes the program association table (PAT) that lists every program in the multi-program transport stream. Each entry in the PAT points to a program map table (PMT) that lists the elementary streams making up each program. Some programs will be unencrypted, but some programs may be subject to conditional access (encryption) and this information is also carried in the metadata. The transport stream can be comprised of fixed-size data packets, for example, each containing 188 bytes. Each packet can carry a program identifier code (PID). Packets in the same elementary stream can all have the same PID, so that the decoder (or a demultiplexer) can select the elementary stream(s) it wants and reject the remainder. Packet continuity counts ensure that every packet that is needed to decode a stream is received. A synchronization system can be used so that decoders can correctly identify the beginning of each packet and deserialize the bit stream into words.

A content item, such as a program, can be a group of one or more PIDs that are related to each other. For instance, a multi-program transport stream used in digital television might contain three programs, to represent three television channels. Suppose each channel consists of one video stream, one or two audio streams, and any necessary metadata. A receiver wishing to tune to a particular "channel" merely has to decode the payload of the PIDs associated with its program. It can discard the contents of all other PIDs.

The multi-program transport stream carries many different programs, and each may use a different compression factor and a bit rate that can change dynamically even though the overall bit rate stays constant. This behavior is called statistical multiplexing and it allows a program that is handling difficult material to borrow bandwidth from a program handling easy material. Each video PES can have a different number of audio and data PESs associated with it. Despite this flexibility, a decoder must be able to change from one program to the next and correctly select the appropriate audio and data channels. Some of the programs can be protected so that they can only be viewed by those who have paid a subscription or fee. The transport stream can comprise Conditional Access (CA) information to administer this protection. The transport stream can comprise Program Specific Information (PSI) to handle these tasks. In an aspect, the transport stream or other data stream can comprise event notifiers, tags, flags, or signals. As an example, the event notifier can represent a time slot for an advertisement or an alternate content. As a further example, the event notifier can represent a blackout of content. In an aspect, the event notifiers can be dependent upon the user location receiving the stream. As an example, a national advertisement can be replaced by a local advertisement in response to an event notifier. As a further example, a local programming can be subject to blackout, while other locales have permission to present the programming.

As described in greater detail below, provided are methods and systems for controlling content in response to processing repeatedly embedded signals. In an aspect, a placement signal can be repeatedly embedded in a fragmented data stream that is transmitted to a user device. Accordingly, as the user device processes the data stream, the user device can process the repeatedly embedded signal in order to control a content. As an example, the placement signal can be embedded based upon a particular event, such as an advertisement spot, alternative content, and/or programming blackout.

Figure 2:
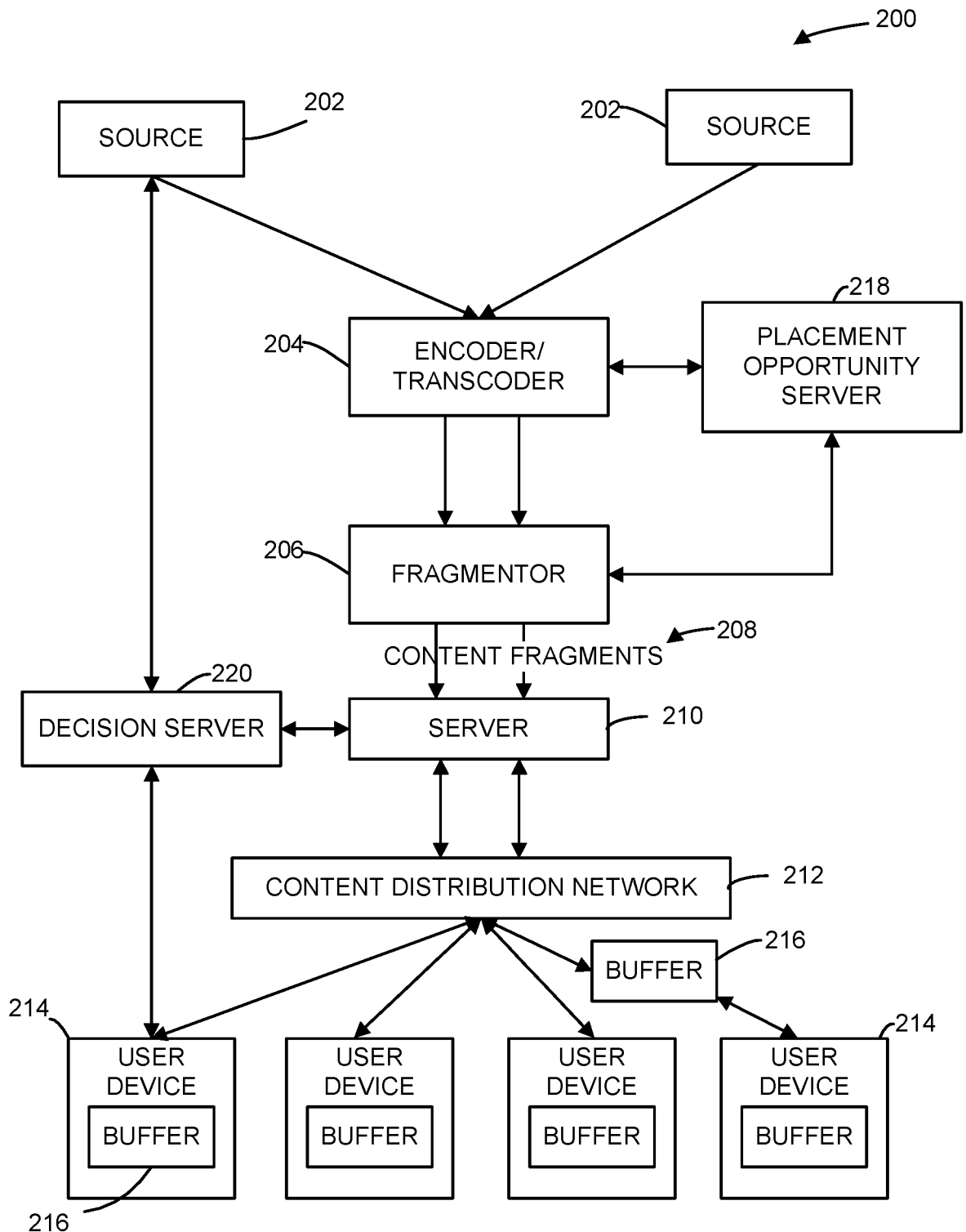
FIG. 2 is a block diagram of an exemplary system.

FIG. 2 is a block diagram of an exemplary content control system 200. The system 200 can comprise one or more data sources 202 for accessing and/or transmitting data, such as a data stream, an encoder 204 in signal communication with the data source 202, and a fragmentor 206 in signal communication with the encoder 204. As an example, the encoder 204 and the fragmentor 206 are integrated as part of a unitary device. However, the encoder 204 and the fragmentor 206 can be separate and distinct components.

In an aspect, the data sources 202 can comprise a content provider (e.g. audio content, video content, data, news feed, sports programming, advertisements, etc.) configured to transmit the data (e.g., as a stream, fragments, files, etc.) to various end-users. In an aspect, one or more data source 202 can comprise an advertisement database having a plurality of advertisements stored therein or capable of accessing advertisement stored elsewhere. As an example, the advertisement database can comprise a plurality of video advertisements. As a further example, the plurality of advertisements can each have a particular time duration associated therewith. In an aspect, the time duration associated with the advertisements or alternate content can be varied in duration for application in various time dependent circumstances. As an example, a particular advertisement can have multiple versions, wherein each version of the same advertisement can have a different time duration. Accordingly, an advertisement having a particular time duration can be retrieved to fill a time slot having a substantially equal time duration. However, any advertisement or advertisements can be retrieved or transmitted to the end user.

As an example, one or more of the data sources 202 can comprise a network data feed transmitting the data stream to users such as subscribers or clients. As a further example, the one or more data source 202 can be configured to transmit the data stream in a standard video format, such as, but not limited to, any of the Moving Picture Experts Group standards (e.g., MPEG-2, MPEG-4, a single MPEG-4 video encapsulated in an MPEG-2 transport stream over UDP MCAST, etc.), or any of the standards for audio and/or video, such as MP3, Quicktime, and Audio Video Interleave (avi). However, the encoder 204 can be configured to receive the data stream from any source having any format that can be encoded (or transcoded) into a format that is appropriate for streaming or otherwise transmitting.

The encoder 204 can be any device, system, apparatus, or the like to encode and/or transcode the data stream. In an aspect, the encoder 204 converts a single (high) bit rate to an output of multiple (lower) bitrates. As an example, the encoder 204 can convert the data stream from the input format received from the data source (such as MPEG-2) to a transport format for distribution to consumers (such as MPEG-4). In an aspect, the encoder 204 can be a device such as a transcoder that conditions streaming data and/or changes it from one format to another. The encoder 204 can be configured to receive the data stream, or other type of signal, from one or more of the data source 202 and encode/transcode information onto the data stream. In an exemplary embodiment, the encoder 204 adds information to the signal relating to content fragments 208.

In an aspect, the fragmentor 206 can be in signal communication with the encoder 204 to receive the data stream therefrom. As an example, the fragmentor 206 and the encoder 204 are configured as a unitary device. However, the fragmentor 206 and the encoder 204 can be integrated or separate. In an aspect, fragmentor 206 conditions the data stream (or other data signal) for downstream distribution by a server 210 through a content distribution network 212 to user devices 214 (e.g. the decoder 120) of the content. In an aspect, the server 210 can be an origin Hypertext Transfer Protocol (HTTP) server. However, other servers an be used. As an example, the fragmentor 206 can communicate with the server 210 using the POST method of the HTTP. However, other protocols and communication methods can be used.

In an exemplary embodiment, the fragmentor 206 separates or fragments the data stream into each of the content fragments 208 represented by the data stream based upon an information encoded onto the data stream by the encoder 204. In an additional exemplary embodiment, the fragmentor 206 accesses the information encoded/inserted in the data stream by the encoder 204 to define the content fragments 208 based on, among other things, boundaries, grouping, timing, and duration from the encoded data stream. Once the content fragments 208 are generated, the content fragments 208 can be transmitted to the content distribution network (CDN) 212 for delivery to the user devices 214 for consumption (e.g., playback). As an example, the server 210, CDN 212, and the user devices 214 can intercommunicate using the GET method of HTTP. However, other protocols and communication methods can be used.

In an aspect, one or more of the user devices 214 can comprise a buffer 216. As an example, the buffer 216 can comprise a memory or a storage device. As a further example, a number of the content fragments 208 can be loaded into the buffer 216 and stored for playback by the associated user device 214. However, other data, content, and/or information can be stored in the buffer 216 such as advertisements and alternative content, for example. In an aspect, the buffer 216 can be separate from the user device 214. For example, the buffer 216 can be located upstream of the user device 214 and downstream of the CDN 212. As a further example, the buffer 216 can store information to be transmitted to any number of user devices 214 or other recipient devices. Accordingly, the user device 214 can retrieve the content fragments 208 from the buffer 216 for playback without having to communicate with the CDN 212, thereby reducing latency in playback. In an aspect, the user device 214 can process a continuous streaming track, which can comprise audio, video, or other data from the server 210 with a regular cadence (e.g., every two seconds, four seconds, ten seconds). As an example, a sparse data track can be transmitted to the user device 214 based upon irregular requests, and can comprise sporadic data, such as closed captions, commentary, advertisements, or information relating to the insertion of content such as advertisement, blackouts, and/or alternative content. Other data and tracks can be received and processed by the user devices.

Figure 3:
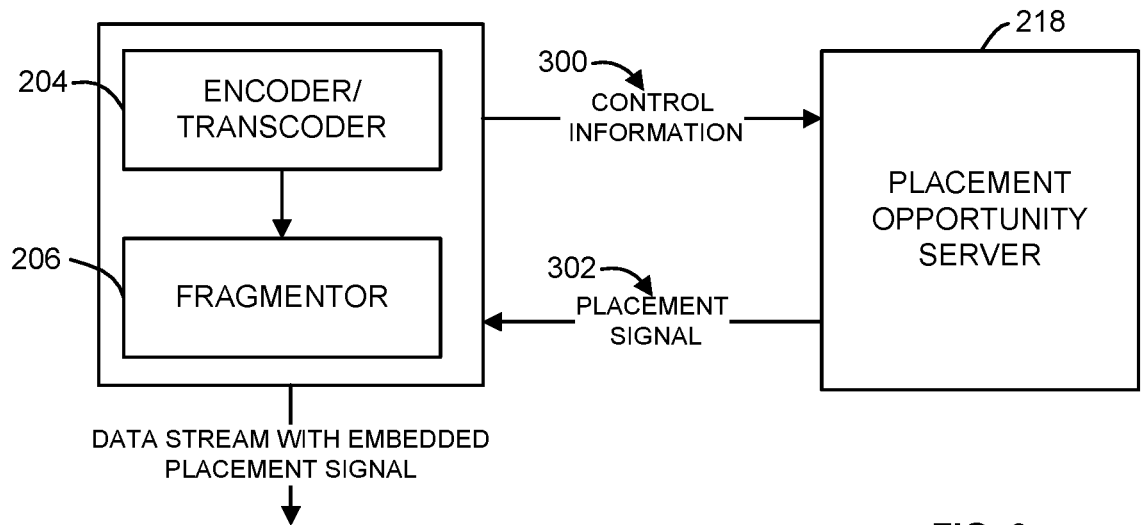
FIG. 3 is a block diagram of an exemplary system.

In an aspect, a placement opportunity server 218 (e.g., Placement Opportunity Information Service (POIS)) can be in communication with one or more of the encoder 204 and the fragmentor 206. As an example, when the fragmentor 206 receives a data stream comprising an event identifier (e.g., advertisements identifier, content identifier, blackout identifier, flags, and/or markers) the fragmentor 206 can communicate a message comprising control information 300 to the placement opportunity server 218, as shown in FIG. 3.

In an aspect, the control information 300 can indicate that an event, such as a placement opportunity, is represented in the data stream or signal. Accordingly, the placement opportunity server 218 can process the control information 300 and can transmit a placement signal 302 to the fragmentor 206 for insertion into the data stream. In an aspect, the placement signal 302 can comprise a time duration of an available time slot (e.g. advertisement time slot) based upon the control information 300 and/or associated with the event. As an example, the placement opportunity server 218 can control a frequency by which the fragmentor 206 inserts/embeds the placement signal 302 into the data stream. As a further example, the fragmentor 206 can insert the placement signal 302 into the data stream during at least the duration of the available time slot. In an aspect, the placement signal 302 can be transmitted to the user device 214 without being inserted into the data stream, such as an independent transmission or insertion into another signal.

In an aspect, the placement signal 302 can comprise a sparse data track. As an example, the placement signal 302 can comprise data relating to a particular event represented in the data stream. As a further example, the placement signal 302 can comprise a message, such as an XML message, json, or binary encoded message, that can be embedded into a data stream. As an example, the placement signal 302 can comprise a message format as shown below:

```
EmbeddedSiqnal.xsd
<?xml version="1.0" encoding="UTF-8" standalone="yes"?>
<schema version="1.0" xmlns="
    elementFormDefault="qualified"
    targetNamespace="
    xmlns:tns=">
  <element name="altContent" type="tns:altContent"/>
  <complexType name="altContent">
    <sequence>
      <element name="uid" type="string" minOccurs="1" />
      <element name="action" type="tns:action" minOccurs="1"/>
      <element name="locations" type="string" minOccurs="1"
        maxOccurs="unbounded"/>
      <element name="uri" type="string" minOccurs="1"/>
    </sequence>
  </complexType>
  <simpleType name="action">
    <restriction base="string">
      <enumeration value="START"/>
      <enumeration value="STOP"/>
    </restriction>
  </simpleType>
</schema>
```

However, the placement signal 302 can have any format and can be transmitted independently. In an aspect, the placement signal 302 can be inserted in a header, metadata, digest, and/or manifest, for transmission to a recipient device.

In an aspect, the placement opportunity sever 218 and/or the fragmentor 206 can control a frequency by which the placement signal 302 can be embedded/inserted/modified in the data stream based upon the time duration of the associated available time slot. As an example, a content provider can embed the placement signal 302 in a source data stream or signal. However, the frequency of these embedded placement signals 302 can be modified by a downstream device (e.g., content provider embeds placement signal 302 every 30 seconds, and the placement opportunity sever 218 and/or the fragmentor 206 add placement signals 302 such that the placement signal 302 are repeated every 10 seconds). Any frequency and distribution can be used.

Figure 4:
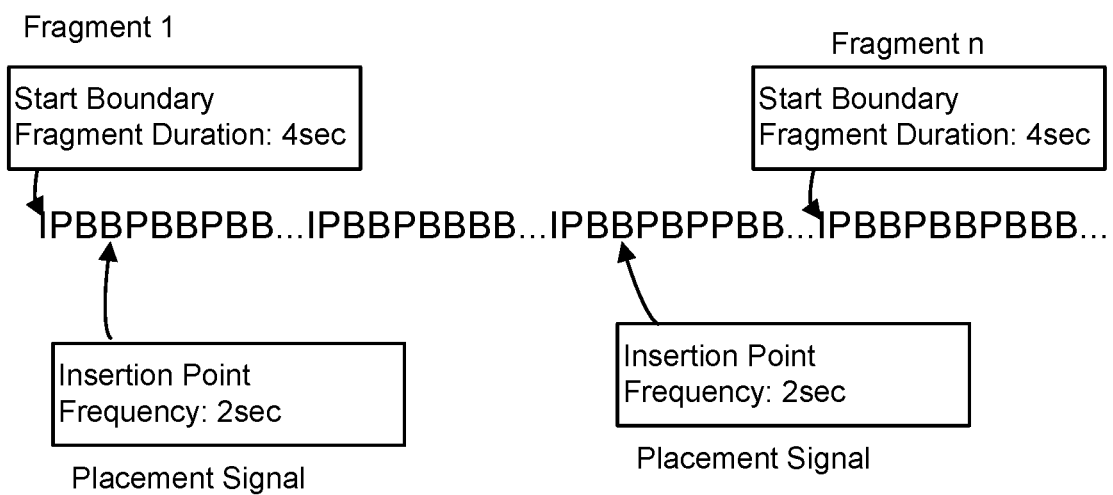
FIG. 4 is a representation of an exemplary data stream.

In an aspect, the time duration of an available time slot can be 40 seconds and can comprise 'n' number of content fragments 208, as illustrated in FIG. 4, wherein each content fragment 208 can comprise a plurality of group-of-picture frames (e.g. I-, P-, and B-frames) for representing underlying content. However, other formats, content, and data can be represented by the content fragments 208. As a further example, the frequency of insertion of the placement signal 302 can be set to 2 seconds, thereby inserting the placement signal into the content fragments 208 sequentially every 2 seconds. However, any frequency can be used.

Returning to FIG. 2, a decision server 220 can be in communication with one or more of the user devices 214. In an aspect, the decision server 220 can be in communication with one or more data sources 202 and/or an origin server (e.g. server 210). As an example, the decision server 220 can be an advertisement decision server for selecting and/or transmitting advertisements to the user device 214. In an aspect, the user device 214 can be configured to query the decision server 220 in response to receiving and/or processing one of the placement signals 302. As an example, each of the placement signals 302 can comprise instructions to cause the user device 214 to request particular content to be delivered to the user device 214 in response to the placement signals 302. As a further example, the user device 214 transmits a query or request to the decisions server 220 in response to processing one of the placement signals 302. In an aspect, the user device 214 can be configured to ignore repeated ones of the placement signals 302 so that a query is not initiated for each and every processed placement signal 302. Accordingly, the decision server 220 can receive the query or request and can control the content being transmitted to the user device 214.

In an aspect, the decision server 220 can determine whether particular content data (e.g., advertisement, blackout screen, alternative programming content, etc.) should be transmitted to the user device 214. As an example, the content data can be transmitted directly to the user device 214 from source 202. However, the content data can be routed through the CDN 212 or other network. As a further example, the content data can be retrieved directly from one or more of the data sources 202 or from an origin server such as the server 210. In an aspect, content data can be spliced into the content fragments 208 received at the user device 214 based upon an instruction from the decision server 220.

As described in greater detail below, provided are methods for embedding a signal for use in controlling content transmitted to a user device. In an aspect, a placement signal can be repeatedly embedded in a data stream to ensure that a recipient device will process the placement signal in an efficient and timely manner.

Figure 5:
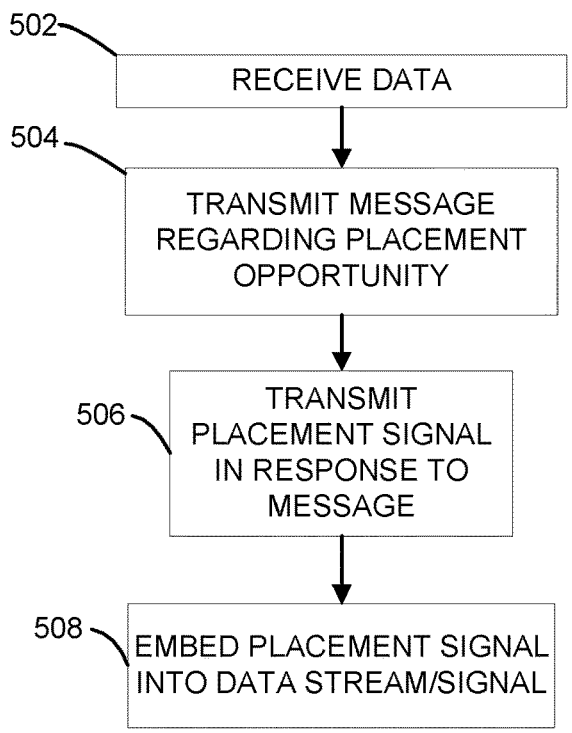
FIG. 5 is a flow chart of an exemplary method.

FIG. 5 illustrates an exemplary method for controlling content placement. The method illustrated in FIG. 5 will be discussed in reference to FIGS. 1-4, for example only. In step 502, data can be received by a data packaging device (e.g., the fragmentor 206). In step 504, when the data comprises an event signal, marker, or the like, the data packaging device transmits a message to the placement opportunity server 218 to inform the placement opportunity server 218 of the event signal.

In step 506, the placement opportunity server 218 processes the message and returns the placement signal 302 to the fragmentor 206, wherein the placement signal 302 comprises information relating to the time duration of the event associated with the event signal. In an aspect, the time duration of the event can be used to determine a frequency by which the placement signal 302 can be transmitted and/or inserted into a data stream that can be transmitted to one or more of the user device 214, as shown in step 508.

As described in greater detail below, provided are methods for controlling content presented to a user device in response to processing an embedded signal. As an example, a placement signal can be embedded in a data stream based upon a particular event such as an advertisement spot, alternative content, and/or programming blackout. Accordingly, when a recipient device processes the placement signal, a content associated with the particular event can be presented via the recipient device.

Figure 6:
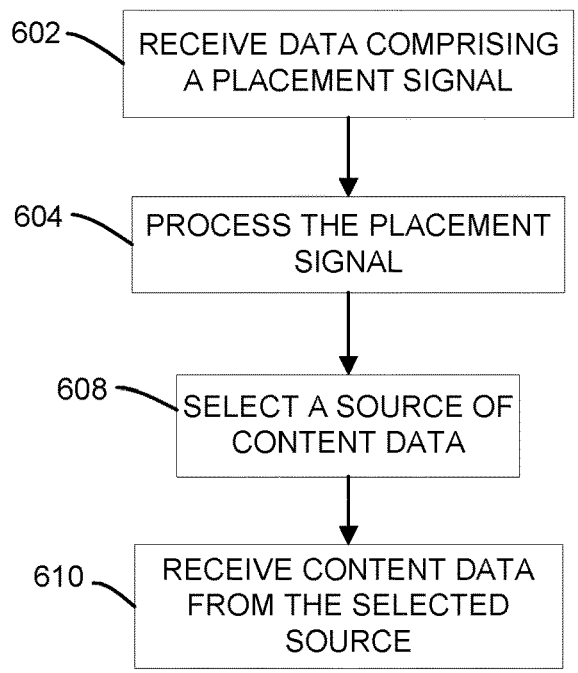
FIG. 6 is a flow chart of an exemplary method.

FIG. 6 illustrates an exemplary method for controlling content placement. The method illustrated in FIG. 6 will be discussed in reference to FIGS. 1-4. In step 602, a data can be received by one or more of the user devices 214. In an aspect, the data received by the user devices 214 can comprise content fragments 208. As an example, the data received by the user devices 214 can comprise the repeatedly embedded placement signals 302. As a further example, the data received by the user devices 214 can comprise a plurality of the placement signals 302 transmitted to the user devices 214 based upon a pre-determined frequency.

In step 604, the user device(s) 214 receiving the placement signal(s) 302 can process the signal. In an aspect, the placement signal(s) can comprise information relating to a particular content and/or a time duration associated with a particular event.

In 606, the user device(s) 214 processing the placement signal(s) 302 can transmit a message, query, request, or the like to the decision server 220 in order to determine content to be presented on the user device.

In an aspect, the decision server 220 can determine whether particular content data (e.g., advertisement, blackout screen, alternative programming content, etc.) should be transmitted to the user device 214. As an example, the content data can be transmitted directly to the user device 214. However, the content data can be routed through the CDN 212 or other network. As a further example, the content data can be retrieved directly from one or more of the data sources 202 or from an origin server, such as the server 210. In an aspect, content data can be spliced into and/or between the content fragments 208 received at the user device 214 based upon an instruction from the decision server 220.

In an aspect, the user device 214 can receive content from a first channel of the data stream. As an example, the user device 214 can receive a command to change to a second channel or portion of the data stream, generate a mosaic of multiple videos, and/or generate a picture-in-picture. As a further example, the command to change can be transmitted from any control device, such as a remote control device or software. In an aspect, the change to the second channel occurs during a time duration of a particular event. Since the placement signal 302 has been repeatedly embedded in the data stream, the at least one of the embedded placement signals 302 can be processed by the user device 214 during the time duration of the event. Accordingly, the user device 214 can be configured to receive content from the second channel, wherein the content provided from the second channel can be determined based on the embedded placement signal 302.

As described in greater detail below, provided are systems for controlling content transmitted to a user device in response to processing an embedded signal. In an aspect, the methods and systems disclosed can utilize one or more computers to perform one or more functions in one or more locations.

Figure 7:
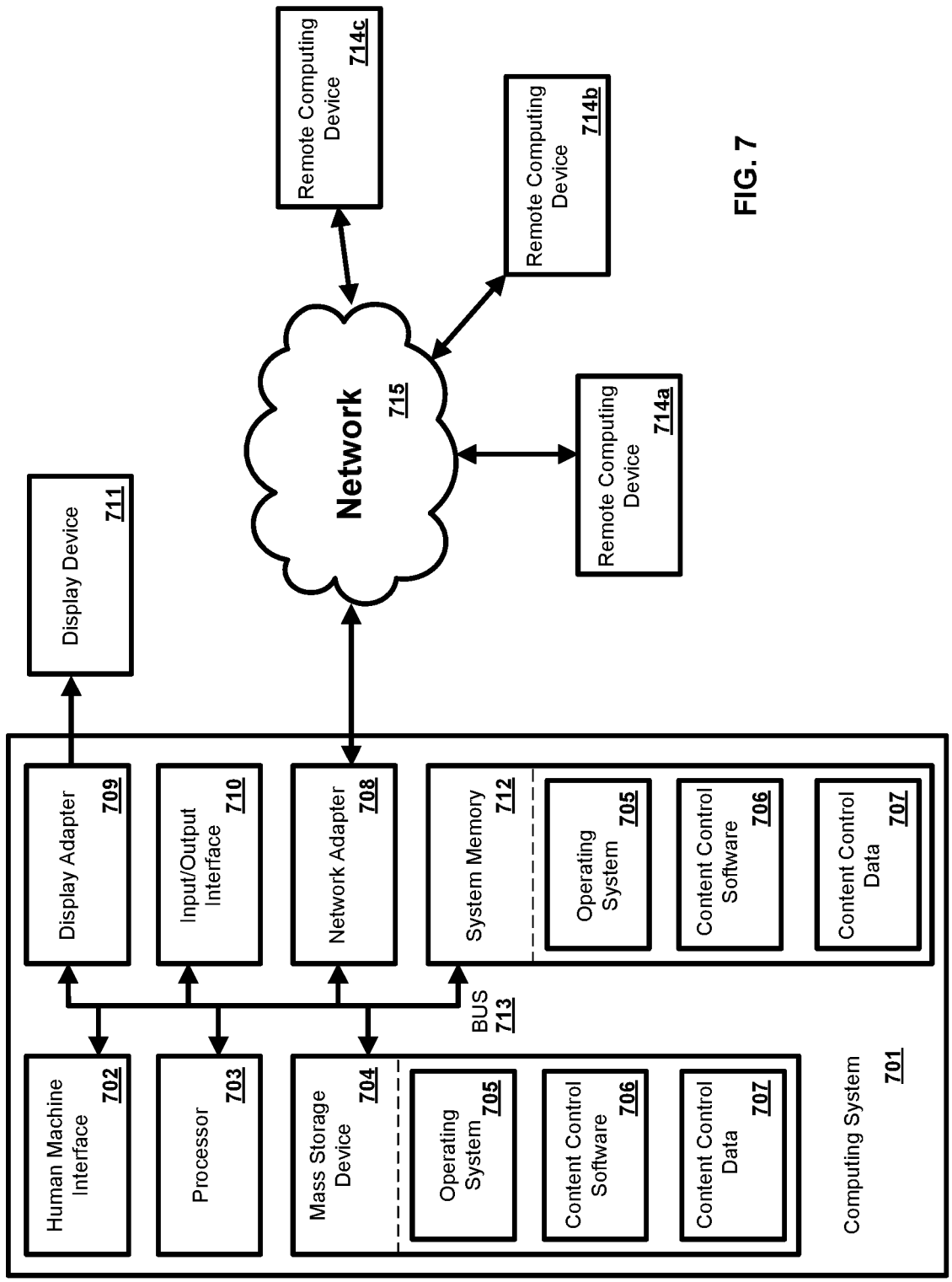
FIG. 7 is a block diagram of an exemplary computing system.

In an exemplary aspect, the methods and systems can be implemented on a computing system 701 as illustrated in FIG. 7 and described below. By way of example, server 210, the user device 214, and/or the decision server 220 of FIG. 2 can be a computing system as illustrated in FIG. 7.

FIG. 7 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, and/or distributed computing environments that comprise any of the above systems or devices.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing system 701. The components of the computing system 701 can comprise, but are not limited to, one or more processors or processing units 703, a system memory 712, and a system bus 713 that couples various system components including the processor 703 to the system memory 712. In the case of multiple processing units 703, the system can utilize parallel computing.

The system bus 713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems, including the processor 703, a mass storage device 704, an operating system 705, content control software 706, content control data 707, a network adapter 708, system memory 712, an Input/Output Interface 710, a display adapter 709, a display device 711, and a human machine interface 702, can be contained within one or more remote computing devices 714a,b,c at physically separate locations, connected through buses of this form, in effect implementing a fully distributed system.

The computing system 701 typically comprises a variety of computer readable media. Exemplary readable media can be any available media that is accessible by the computing system 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as content control data 707 and/or program modules such as operating system 705 and content control software 706 that are immediately accessible to and/or are presently operated on by the processing unit 703.

In another aspect, the computing system 701 can also comprise other removable/non-removable, volatile/non-volatile computer storage media. By way of example, FIG. 7 illustrates a mass storage device 704 which can provide non-volatile storage of computer code, computer readable instructions, data structures, program modules, and other data for the computing system 701. For example and not meant to be limiting, a mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, an operating system 705 and content control software 706. Each of the operating system 705 and content control software 706 (or some combination thereof) can comprise elements of the programming and the content control software 706. Content control data 707 can also be stored on the mass storage device 704. Content control data 707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems. In an aspect, content control data 707 can comprise information relating to events, event notifiers, placement spots, alternate programming, programming blackout, advertisements, and the like. As an example, the content control data can comprise information relating to a particular programming being transmitted to a user location. As a further example, the content control data can comprise information and instructions related to processing placement signals and updating content being transmitted to a user location. However, other information can be associated with the content control data, such as information about the subscriber consuming the content including location, device type, and subscription information, and information relating the content for blackouts including blackout locations and alternative content associated with the blackout.

In another aspect, the user can enter commands and information into the computing system 701 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 703 via a human machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, a display device 711 can also be connected to the system bus 713 via an interface, such as a display adapter 709. It is contemplated that the computing system 701 can have more than one display adapter 709 and the computing system 701 can have more than one display device 711. For example, a display device can be a monitor, an LCD (Liquid Crystal Display), or a projector. In addition to the display device 711, other output peripheral devices can comprise components such as speakers (not shown) and a printer (not shown) which can be connected to the computing system 701 via Input/Output Interface 710. Any step and/or result of the methods can be output in any form to an output device. Such output can be any form of visual representation, including, but not limited to, textual, graphical, animation, audio, tactile, and the like. The display 711 and computing system 701 can be part of one device, or separate devices.

The computing system 701 can operate in a networked environment using logical connections to one or more remote computing devices 714a,b,c. By way of example, a remote computing device can be a personal computer, portable computer, smartphone, a server, a router, a network computer, a peer device or other common network node, and so on. Logical connections between the computing system 701 and a remote computing device 714a,b,c can be made via a network 715, such as a local area network (LAN) and/or a general wide area network (WAN). Such network connections can be through a network adapter 708. A network adapter 708 can be implemented in both wired and wireless environments. Such networking environments are conventional and commonplace in dwellings, offices, enterprise-wide computer networks, intranets, and the Internet.

For purposes of illustration, application programs and other executable program components such as the operating system 705 are illustrated herein as discrete blocks, although it is recognized that such programs and components reside at various times in different storage components of the computing system 701, and are executed by the data processor(s) of the computer. An implementation of content control software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and communications media. "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. An apparatus comprising:
one or more processors; and
memory storing processor executable instructions that, when executed by the one or more processors, cause the apparatus to:
receive a data stream;
determine an event associated with the data stream, wherein the event is associated with a time duration;
generate, based on the event, a placement signal that comprises an instruction to modify the data stream;
determine, based on the time duration, a time interval for repeatedly embedding the placement signal into a portion of the data stream; and
embed, based on the time interval, the placement signal into the portion of the data stream.

2. The apparatus of claim 1, wherein the instruction causes a user device to modify the data stream based on the event.

3. The apparatus of claim 1, wherein the processor executable instructions that, when executed by the one or more processors, cause the apparatus to embed the placement signal into the portion of the data stream causes the apparatus to embed, based on the time interval, the placement signal into the portion of the data stream repeatedly.

4. The apparatus of claim 1, wherein the time duration is equal to a time slot.

5. The apparatus of claim 1, wherein the placement signal comprises data indicative of the time duration.

6. The apparatus of claim 1, wherein the event comprises at least one of: an available advertising time slot or an alternate content time slot.

7. The apparatus of claim 1, wherein the placement signal comprises a sparse data track.

8. An apparatus comprising:
one or more processors; and
memory storing processor executable instructions that, when executed by the one or more processors, cause the apparatus to:
receive a data stream comprising a placement signal repeatedly embedded into a portion of the data stream at a time interval based on a time duration of an event associated with the data stream, wherein the placement signal comprises an instruction to modify the data stream based on the time duration;
process the placement signal to select a source of content; and
receive content from the source of content, wherein the content has a content time duration equal to a time slot.

9. The apparatus of claim 8, wherein the data stream is a fragmented data stream.

10. The apparatus of claim 8, wherein the time duration of the event is equal to the time slot.

11. The apparatus of claim 8, wherein the placement signal comprises data indicative of the time duration.

12. The apparatus of claim 8, wherein the event comprises at least one of: an available advertising time slot or an alternate content time slot.

13. The apparatus of claim 8, wherein the placement signal comprises a sparse data track.

14. One or more non-transitory computer-readable media storing processor-executable instructions that, when executed by at least one processor, cause the at least one processor to:
receive a data stream;
determine an event associated with the data stream, wherein the event is associated with a time duration;
generate, based on the event, a placement signal that comprises an instruction to modify the data stream;
determine, based on the time duration, a time interval for repeatedly embedding the placement signal into a portion of the data stream; and
embed, based on the time interval, the placement signal into the portion of the data stream.

15. The one or more non-transitory computer-readable media of claim 14, wherein the instruction causes a user device to modify the data stream based on the event.

16. The one or more non-transitory computer-readable media of claim 14, wherein the processor-executable instructions that, when executed by the at least one processor, cause the at least one processor to embed the placement signal into the portion of the data stream causes the at least one processor to embed, based on the time interval, the placement signal into the portion of the data stream repeatedly.

17. The one or more non-transitory computer-readable media of claim 14, wherein the time duration is equal to a time slot.

18. The one or more non-transitory computer-readable media of claim 14, wherein the placement signal comprises data indicative of the time duration.

19. The one or more non-transitory computer-readable media of claim 14, wherein the event comprises at least one of: an available advertising time slot or an alternate content time slot.

20. The one or more non-transitory computer-readable media of claim 14, wherein the placement signal comprises a sparse data track.

21. One or more non-transitory computer-readable media storing processor-executable instructions that, when executed by at least one processor, cause the at least one processor to:
receive a data stream comprising a placement signal repeatedly embedded into a portion of the data stream at a time interval based on a time duration of an event associated with the data stream, wherein the placement signal comprises an instruction to modify the data stream based on the time duration;
process the placement signal to select a source of content; and
receive content from the source of content, wherein the content has a content time duration equal to a time slot.

22. The one or more non-transitory computer-readable media of claim 21, wherein the data stream is a fragmented data stream.

23. The one or more non-transitory computer-readable media of claim 21, wherein the time duration of the event is equal to the time slot.

24. The one or more non-transitory computer-readable media of claim 21, wherein the placement signal comprises data indicative of the time duration.

25. The one or more non-transitory computer-readable media of claim 21, wherein the event comprises at least one of: an available advertising time slot or an alternate content time slot.

26. The one or more non-transitory computer-readable media of claim 21, wherein the placement signal comprises a sparse data track.

* * * * *